UNITED STATES PATENT OFFICE.

GEORGE C. DEETER, OF MECHANICSBURG, PENNSYLVANIA.

METAL ALLOY.

1,340,437.      Specification of Letters Patent.      Patented May 18, 1920.

No Drawing.      Application filed June 18, 1919. Serial No. 304,981.

*To all whom it may concern:*

Be it known that I, GEORGE C. DEETER, a citizen of the United States, residing at Mechanicsburg, in the county of Cumberland and State of Pennsylvania, have invented certain new and useful Improvements in Metal Alloys, of which the following is a specification.

This invention relates to an improved metal alloy, intended primarily for use as a deoxidizing and fluxing agent in the preparation or melting down of certain metals or combinations of metals, and the invention consists partly in combining metallic arsenic to certain named metals, and partly in the particular method employed to obtain that certain result in a fluxing agent that will guarantee the desired result in the final product into which this agent enters as a component part.

The object in the present instance is, among other things, to replace phosphor copper or other similar deoxidizers, and to supply an agent that will act as a scavenger or cleanser, and by the use of which I am enabled to produce metals of maximum strength, density and ductility.

My invention consists of the introduction of metallic arsenic, in proportions varying from 5 per cent. to 30 per cent., into metals such as lead, tin, zinc and aluminium in proportions varying from 70 per cent. to 95 per cent.

The mere introduction of metallic arsenic, in certain specified proportions, into any of the metals above named in certain specified proportions, may in itself constitute a new and useful step in the art, when carried forward by means of the method employed by me in securing the proper mixing of the component parts.

In the production of my improved alloy, I have found by actual experiment, that the following procedure is not only possible, but that it is the proper method of obtaining the desired result:—

I place the metallic arsenic in the bottom of a proper receptacle, such as a crucible or furnace and I then cover this metallic arsenic with a suitable flux or protective coating, and I then place the metal or metals to be alloyed, on the top of the flux covered metallic arsenic; the receptacle is then covered, and placed in a pit or furnace for reduction.

The metal or metals to be alloyed, being fusible at a lower degree than is the metallic arsenic, will, when the melting begins, flow down over the metallic arsenic, thus effecting a gradual combination of the metallic arsenic with the other metal or metals, and finally resulting, by reason of this method of combining them, in a perfect alloy of the said metal or metals with the metallic arsenic.

It is evident that by the use of my improved fluxing agent, I have been able to provide a better means of introducing the metallic arsenic into the metals in which it is finally used, than has been heretofore in use, for the reason that all danger of explosion is eliminated, such as is frequently caused when an attempt is made to introduce the pure metallic arsenic into molten metal.

One of the principal advantages of my improved fluxing agent is the fact that its use will serve to hold up any percentage of lead in copper, and its value is also proven when used as a deoxidizer and strengthener in the case of brass, bronze and metals carrying a high percentage of lead.

Having thus fully described my invention, I claim and desire to secure by Letters Patent:—

1. A compound to be used as a fluxing agent, comprising as its principal component parts, metallic arsenic from five to thirty per cent. and an easily fusible metal such as lead, seventy to ninety-five per cent.

2. A compound containing as its principal parts, metallic arsenic five per cent. and lead ninety per cent.

In testimony whereof I affix my signature.

GEORGE C. DEETER.